United States Patent

[11] 3,601,260

[72] Inventor Rene Le Guennec
    Villepreux, France
[21] Appl. No. 17,588
[22] Filed Mar. 9, 1970
[45] Patented Aug. 24, 1971
[73] Assignee Commissariat A L'Energie Atomique
    Paris, France
[32] Priority Mar. 31, 1969
[33] France
[31] 6909743

[54] REMOTE MANIPULATORS
    2 Claims, 2 Drawing Figs.
[52] U.S. Cl. .................................................. 214/1 CM
[51] Int. Cl. ................................................... B25j 3/00
[50] Field of Search ...................................... 214/1 CM

[56] References Cited
    UNITED STATES PATENTS
    3,297,172 1/1967 Haaker .................. 214/1 CM 3,428,189 2/1969 Ainsworth ................. 214/1 CM Primary Examiner—Gerald M. Forlenza
Assistant Examiner—George F. Abraham
Attorney—Cameron, Kerkam and Sutton ABSTRACT: In a master-slave manipulator comprising a wall-traversing tube, two normally horizontal arms each constituted by two coaxial tube elements so arranged that one element is pivotally coupled to one end of the wall-traversing tube and the other element is pivotally coupled to a forearm, an internal sleeve is capable of pivoting within both coaxial tube elements of the master arm about the common axis thereof. The sleeve is associated with an external pulley and cable system and driven by a reduction-gear motor in order to produce the relative rotational motion of the tube element which is pivotally coupled to the slave forearm without thereby producing any relative rotational motion in the master arm between the two corresponding tube elements.

REMOTE MANIPULATORS

This invention relates to a remote handling device of the type known as a master-slave manipulator, that is to say a device in which the movements produced by an operator on an articulated assembly located outside a cave wall are transmitted through a wall-traversing unit to a second articulated assembly which is located inside a said cave wall, the second a assembly being similar to the first assembly and intended to reproduce the movements of this latter.

Moreover, the invention is more particularly concerned with one constructional design of remote manipulator of the general type referred to. In this design, the master end of the manipulator is constituted by an arm which is normally parallel to the cave wall and is pivotally coupled to a wall-traversing tube by means of a shoulder yoke, said tube being located at right angles to said cave wall and capable of rotating about its own axis. The extremity of the master arm is fitted with an elbow yoke, a forearm being in turn pivotally attached to said elbow yoke and fitted with a terminal control handle. The slave end of the manipulator reproduces a similar arrangement; and the control handle at the master end corresponds to a handling grab or tong unit at the slave end. In an arrangement of this type, the arms of the remote manipulator are parallel to each other and usually disposed in the same horizontal plane, the cave wall being vertical. In all cases, the movements of the master assembly are transmitted to corresponding elements of the slave assembly by means of cables or chains and these latter are adapted to cooperate with pulleys or sprockets which are carried by both assemblies.

In order that it may be possible not only to obtain movements corresponding to pivotal movements of the arms or forearms about their respective shoulder and elbow yokes but also to obtain other movements corresponding in particular to a rotation of the arm or forearm about its own axis, these components of the remote manipulator are constructed of tubular elements consisting of two sections which are capable of rotating relative to each other. Thus, the master arm has a first tube element which is pivotally mounted in the shoulder yoke of the wall-traversing tube and a second tube element which is coaxial with the first so as to permit relative rotational motion of said elements. Provision is also made on the second tube element of the master arm for a pulley having at least one groove for accommodating a cable, said cable being guided and transferred by means of other pulleys which are carried by the wall-traversing tube, then passed over a pulley which is similar to the first and provided on the element of the corresponding tube element of of the slave arm. Under these conditions, the movement of rotation of the second tube element on the master side produces an identical movement of rotation of the second tube element on the slave side and therefore an equivalent movement of angular displacement of the corresponding forearms, the resultant twisting of the transmission cable or cables being nevertheless limited to an acceptable value. A similar assembly is also provided on the master and slave forearms in order to transmit their own movements of rotation from one to the other and to permit of simultaneous movements of angular displacement of the control handle and of the tong unit.

The aim of this invention is to provide an improvement to remote manipulators of the type referred to in the foregoing and especially to ensure better operating conditions by making it possible to subject the master forearm in the direction of inward and outward reach to an angular movement of displacement relative to the master forearm without modifying the position of this latter or, in other words, by producing the pivotal motion of the second tube element of the slave arm which carries the elbow yoke of the forearm without thereby producing any relative movement of rotation in the master arm between the two corresponding tube elements.

To this end, the invention mainly consists in mounting between the two coaxial tube elements of the master arm a sleeve which is capable of pivoting within said elements about the common axis of these latter, said sleeve being provided externally on the one hand with a pulley associated with at least one cable which is guided through the wall-traversing tube over a pulley carried by the second tube element of the slave arm and on the other hand with a ring gear in meshing relation with a worm which is driven by a reduction-gear motor, said motor being rigidly fixed to the second tube element of the master arm.

Moreover, and in accordance with another characteristic feature, the remote manipulator under consideration comprises means which are directly related to the arrangement mentioned above for continuous balancing of the articulated master and slave assemblies so as to maintain the general equilibrium of the apparatus irrespective of the extent of inward or outward angular displacement which is imparted to the slave arm relative to the master arm. To this end, the master arm is balanced by a first counterweight which is rigidly fixed to the first tube element and the slave arm is balanced by a second counterweight which is independent of the first and rigidly fixed to the pulley which is carried by the sleeve.

The complementary description which is given hereunder by way of indication but without limitation illustrates one exemplified form of construction of a master-slave manipulator which embodies the improvement as contemplated by the present invention.

Figure 1:
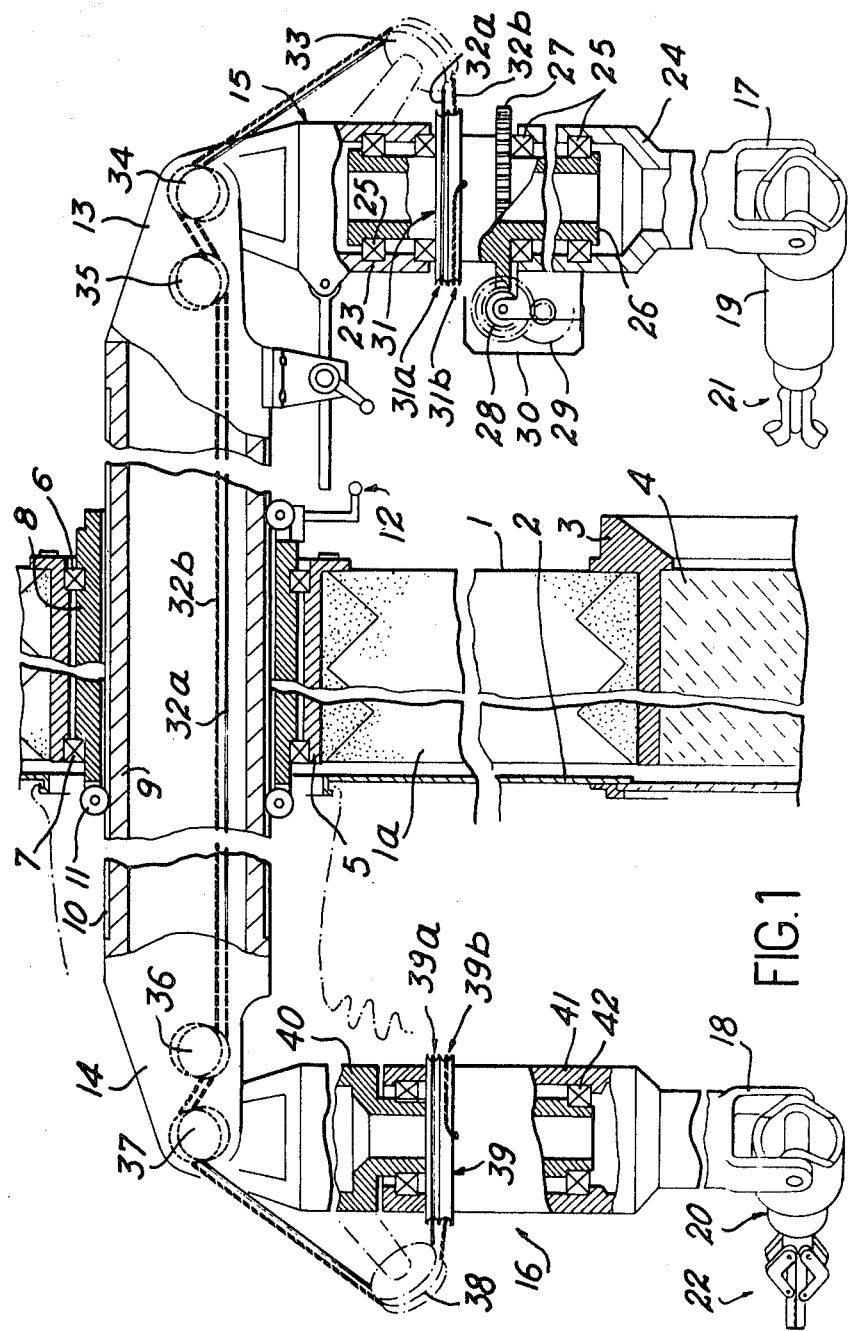
FIG. 1 is a diagrammatic view taken in cross section on a horizontal plane and showing a remote manipulator of the type under consideration.

The vertical wall of a hot cell or cave which is primarily intended for the containment of radioactive products or objects is shown diagrammatically in FIG. 1 and designated therein by the reference numeral 1. The cave wall is constructed in particular of elements 1*a* formed of lead or any suitable material which has high density, thereby affording adequate protection against gamma radiations. Provision is also made for an internal lining consisting of a leaktight metallic membrane 2 which is formed especially of steel and intended to prevent contamination by alpha particles. In FIG. 1, the interior of the cave which is delimited by the wall 1 is located on the left-hand side of the drawing whilst the exterior is located on the right-hand side. The figure represents a cross section taken along a horizontal plane of said wall which is assumed under these conditions to be vertical.

The cave wall 1 is provided in a conventional manner with a metalic member 3 or support frame for a window 4 through which an operator who is stationed outside the cave may view the interior of this latter. Provision is also made for a metallic bushing 5 which is fitted in the wall 1 and for ball bearings 6 and 7 which are fitted in said bushing. Said bearings are adapted to carry a metallic guide 8 or so-called roller tube which is locked translationally with respect to the bushing 5 but capable of rotating about its axis within said bushing by virtue of the ball bearings aforesaid. There is mounted within the roller tube 8 a tubular member 9 which is adapted to pass through the wall 1 from one side to the other, The wall-traversing tube 9 is capable of carrying out an axial movement of displacement within the interior of the roller tube 8 by virtue of the presence of grooves 10 which are formed in the external surface of said traversing tube and in which runner-wheels 11 carried by said roller tube 8 are engaged. A locking device 12 of wholly conventional design serves to secure the wall-traversing tube 9 in a suitable axial position relative to the roller tube 8.

Provision is made at both ends of the traversing tube 9 for two yokes, namely a yoke 13 which is located outside the cave and a yoke 14 located inside this latter. Said yokes will be referred to hereinafter as shoulder yokes. Two similar articulated assemblies, namely a so-called master assembly which is located outside the cave and a so-called slave assembly which is located inside the cave, are mounted in said shoulder yokes. These assemblies comprise respectively an arm 15 or 16 which is pivotally coupled at one end to the corresponding shoulder yoke 13 or 14 and which is provided at the other end with a second yoke or so-called elbow yoke 17 or 18. Forearms 19 and 20 are in turn pivotally attached to said elbow yokes, there being fitted at the extremities of said forearms respectively a control handle 21 on the master assembly side and a tong unit 22 on the slave assembly side. The arms 15 and 16 are maintained in parallel relation by means of a removable locking device 50 and are usually disposed in the horizontal plane which passes through the axis of the wall-traversing tube 9.

In an arrangement of this kind which corresponds to a conventional and well known form of construction as adopted in one particular type of remote manipulator, the arms 15 and 16 are constructed of two coaxial tube elements. The first tube element is pivotally coupled to the shoulder yoke 13 or 14 and the second tube element is adapted to carry the elbow yoke 17 or 18. The relative movement of rotation of the first tube element within the second which is permitted by this arrangement in turn permits pivotal motion of the forearm 19 or 20 in the vertical plane which passes through the corresponding elbow yoke.

The remote manipulator as thus constituted makes it possible to obtain seven degrees of freedom and consequently to carry out in particular:

a lateral movement of the control handle corresponding to a pendular movement of the forearms which remain parallel to each other in their elbow yokes;

a movement of inward and outward reach of the control handle and consequently of the tong unit, namely a movement of these components towards or away from the cave wall, thereby causing the tube elements constituting the arms at the master end and the slave end to carry out a relative movement of rotation one within the other;

a vertical movement corresponding to a vertical displacement of the control handle, with the result that the wall-traversing tube and the roller tube are caused by means of the forearm and arm after release of the locking device to carry out a movement of rotation within the bearings which are mounted within the cave wall passageway;

an orientation of the control handle and of the tong unit in azimuth as obtained by rotation of the forearms about their axes of symmetry, said forearms being constituted in the same manner as the arms by two coaxial tube elements which are capable of carrying out a movement of rotation relative to each other;

a tong-lifting movement as obtained by angular displacement of the control handle about its articulation or wrist which is provided at the end of the forearm;

a movement of rotation of the tong unit;

and finally a movement of closure of the tongs.

In accordance with the invention, the remote manipulator under consideration comprises an improvement which makes it possible while retaining the seven degrees of freedom referred to above to produce an inward or outward angular displacement of the slave forearm 20 with respect to the master forearm 19 without modifying the relative positions of the arms 15 and 16, said arms being maintained parallel to each other as well as parallel to the cave wall 1 if necessary.

To this end, the arm 15 comprises two coaxial tube elements 23 and 24 which are located in the line of extension of each other. A tubular sleeve 26 which serves to lock the two tube elements 23 and 24 translationally without preventing their relative movement of rotation is mounted within a said tube elements with interposition of ball bearings 25. The sleeve 26 is provided in its external surface and between the two tube elements 23 and 24 with a ring gear 27 and this latter is adapted to engage with a worm 28 which is coupled to the output shaft of a reduction-gear motor 29, said motor being supported by a casing 30 which is rigidly fixed to the second tube element 24.

A pulley is also provided on the tubular sleeve 26 in parallel relation to the ring gear 27. In the exemplified embodiment which is illustrated, said pulley has two parallel grooves 31a and 31b in which the extremities of two cables 32a and 32b are intended to be placed, said cables being wound on said pulley in opposite directions. The cables are guided from the master arm 15 to the slave arm 16 by means of a series of guide pulleys 33, 34 and 35 on the master side, 36, 37 and 38 on the slave side and at each end of the wall-traversing tube 9, then terminate within two parallel grooves 39a and 39b a of a pulley 39 which is similar to the first pulley 31 but is mounted on the slave arm 16 opposite to said first pulley. As has already been mentioned in connection with a remote manipulator of known type, said slave arm 16 comprises two coaxial tube elements 40 and 41 which are capable of carrying out a movement of rotation with respect to each other by virtue of the presence of ball bearings 42 which are mounted between said tube elements.

The operation of the remote manipulator as endowed with the improvement according to the invention is as follows: as each control movement is imparted to the master arm 15 by the control handle 21 through the intermediary of the forearm 19 and produces in particular a movement of rotation of the tube element 24 about its axis, the pulley 31 which is carried by the sleeve 26 accordingly carries out a movement of rotation through the same angle, the rotation of the tube element 24 being in fact transmitted to said sleeve by means of the nonreversible system constituted by the reduction-gear motor 29, the worm 28 and the ring gear 27. The rotation of the pulley 31 is immediately transmitted by the cables 32a and 32b to the pulley 39 which in turn drives the tube element 41 of the slave arm 16. This results in a displacement of the slave forearm 20 which is exactly similar to the displacement produced by the master forearm 19.

In consequence, in order to obtain a relative angular displacement between the forearms 19 and 20, it is obviously only necessary to start up the reduction-gear motor 29 which actuates the ring gear 27 by means of the worm 28 and causes the tubular sleeve 26 to carry out a movement of rotation of given amplitude within the master arm 15. The correlative rotation of the pulley 31 is transmitted as before to the pulley 39 and to the element 41 of the slave arm 16, which in turn produces a pivotal motion of the slave forearm 20. However, in this operation and contrarily to the operation which was contemplated heretofore, the master forearm 19 has remained motionless, thus effectively achieving the desired relative displacement of the forearms.

Figure 2:
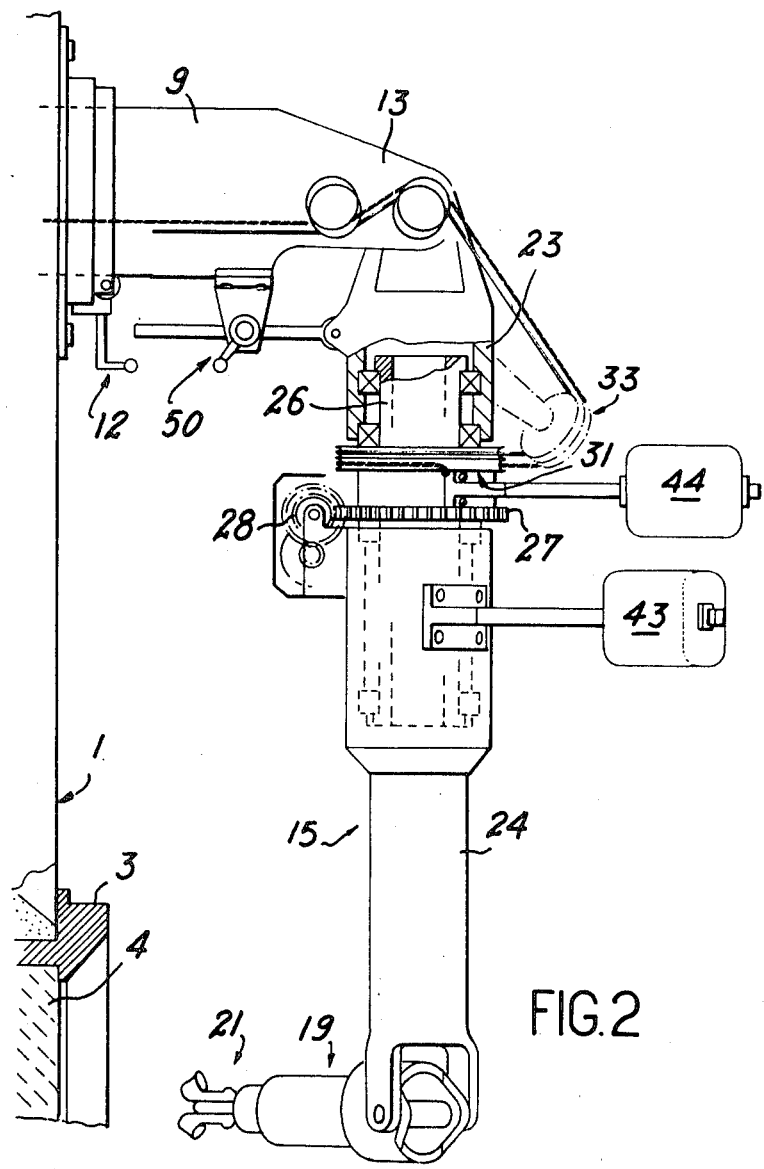
FIG. 2 is a top view taken in partial cross section and showing only the master arm of the remote manipulator.

Moreover, in order to carry out continuous balancing of the articulated master-slave assemblies irrespective of the relative positions of the forearms of the remote manipulator and irrespective in particular of the extent of relative displacement of these latter, provision is made in accordance with another property of the invention for an ancillary device whose design function is to balance the master arm on the one hand and the slave arm on the other hand both separately and continuously. As shown in FIG. 2, the master assembly is accordingly balanced by means of a first counterweight 43 which is rigidly fixed to the external surface of the tube element 24 of the master arm 15. Said counterweight 43 serves to balance the forearm 19 irrespective of the position of this latter about the axis of the arm. Similarly, a second counterweight 44 which is independent of the first is rigidly fixed to the external surface of the sleeve 26 between the ring gear 27 and the pulley 31. Said second counterweight 44 which is consequently coupled for rotation with the sleeve 26 thus ensures continuous balancing of the slave forearm 20 with respect to the master arm 15 irrespective of its position.

It is clearly understood that the invention is not limited in any sense to the exemplified embodiment which has primarily been contemplated in the foregoing description and accompanying drawings but extends on the contrary to all alternative forms. In particular, the counterweight which serves to balance the slave arm could be placed on the wall-traversing tube and could be controlled directly by means of the control cable.

What we claim is:

1. An improvement to remote manipulators of the master-slave type comprising a wall-traversing tube which is provided at the extremities thereof with shoulder yokes for paralleled arms each constituted by two coaxial tube elements which are so arranged that a first element is pivotally coupled to the corresponding shoulder yoke and a second element is provided at the extremity thereof with an elbow yoke for a forearm, wherein a sleeve is mounted between the two coaxial tube elements of the master arm and is capable of pivoting within said tube elements about the common axis thereof, said sleeve being provided externally on the one hand with a pulley coacting with at least one cable which is guided through the wall-traversing tube and coacts with another pulley carried by the second tube element of the slave arm and on the other hand with a ring gear disposed in meshing engagement with a worm driven by a reduction-gear motor which is rigidly fixed to the second tube element of the master arm.

2. An improvement in accordance with claim 1, wherein the master arm is balanced by a first counterweight which is rigidly fixed to the first tube element and the slave arm is balanced by a second counterweight which is independent of the first and rigidly fixed to the pulley which is carried by the sleeve.